US007227322B2

(12) United States Patent
Alipour et al.

(10) Patent No.: US 7,227,322 B2
(45) Date of Patent: Jun. 5, 2007

(54) HOIST WITH DETACHABLE POWER AND CONTROL UNIT

(75) Inventors: Ehsan Alipour, San Francisco, CA (US); Mike Strasser, Lafayette, CA (US); Benjamin Toru Mino, Chicago, IL (US); Thomas King, San Francisco, CA (US); Clinton Stone, Stanford, CA (US)

(73) Assignee: Unovo, Inc., San Francisco, CA (US)

( * ) Notice: Subject to any disclaimer, the term of this patent is extended or adjusted under 35 U.S.C. 154(b) by 0 days.

(21) Appl. No.: 11/192,992

(22) Filed: Jul. 29, 2005

(65) Prior Publication Data

US 2006/0091834 A1 May 4, 2006

Related U.S. Application Data

(60) Provisional application No. 60/592,738, filed on Jul. 29, 2004.

(51) Int. Cl.
*H02P 1/00* (2006.01)
*H01H 13/14* (2006.01)
*B66D 3/26* (2006.01)
*B66D 3/20* (2006.01)

(52) U.S. Cl. ...................... 318/281; 318/139; 318/434; 318/468; 200/298; 254/266; 254/362

(58) Field of Classification Search .................. 318/99, 318/139, 281, 362; 187/281; 254/266, 342, 254/343
See application file for complete search history.

(56) References Cited

U.S. PATENT DOCUMENTS 2,228,824 A * 1/1941 Hermann .................... 439/477
4,175,727 A * 11/1979 Clarke ........................ 254/274
4,283,875 A * 8/1981 Daniels ................... 43/18.1 R
4,633,538 A * 1/1987 James .......................... 5/83.1
4,636,962 A * 1/1987 Broyden et al. ............ 700/228
4,846,725 A * 7/1989 Williams et al. ............ 439/479
4,875,558 A * 10/1989 Berkhan et al. ............ 188/171
5,261,162 A * 11/1993 Siegler ........................ 30/216
5,831,402 A * 11/1998 Yang .......................... 318/281
5,853,165 A * 12/1998 Kuivamaki ................. 254/366
5,899,304 A * 5/1999 Daugherty .................. 188/171
6,027,154 A * 2/2000 Costa ...................... 294/82.21
6,204,777 B1 * 3/2001 Lyons ........................ 340/908
6,241,215 B1 * 6/2001 Gersemsky et al. ........ 254/342
6,265,493 B1 * 7/2001 Chung et al. ............... 525/247
6,463,886 B1 * 10/2002 Rodden et al. ............. 119/728
6,525,282 B2 * 2/2003 Krebs et al. ................ 200/298
6,875,917 B1 * 4/2005 Wood et al. ................ 174/493

(Continued)

FOREIGN PATENT DOCUMENTS

GB 2197817 A * 6/1988

(Continued)

*Primary Examiner*—Paul Ip
(74) *Attorney, Agent, or Firm*—Carol D. Titus; GSS Law Group

(57) ABSTRACT

A hoist is powered by a separate power unit. The hoist unit includes: a motor, a mounting connector, a spool, webbing, auto cut-off and a first portion of a mating electrical connector. The control unit includes a hollow pole, a hook, a second portion of the mating electrical connector, a control switch, electrical circuitry and a battery pack.

30 Claims, 23 Drawing Sheets

U.S. PATENT DOCUMENTS

| | | | | |
|---|---|---|---|---|
| 7,021,427 | B2 * | 4/2006 | Skovgaard et al. | 187/281 |
| 2001/0020698 | A1 * | 9/2001 | Krebs et al. | 254/266 |
| 2001/0025775 | A1 * | 10/2001 | Krebs et al. | 200/298 |
| 2005/0044051 | A1 * | 2/2005 | Selby et al. | 705/500 |
| 2006/0048397 | A1 * | 3/2006 | King et al. | 30/296.1 |
| 2006/0120090 | A1 * | 6/2006 | Wikle et al. | 362/396 |

FOREIGN PATENT DOCUMENTS

| | | | |
|---|---|---|---|
| JP | 2000026077 | A * | 1/2000 |

* cited by examiner

HOIST WITH DETACHABLE POWER AND CONTROL UNIT

CROSS REFERENCE TO OTHER APPLICATIONS

This application claims the benefit of U.S. Provisional Application 60/592,738, filed on Jul. 29, 2004, which is hereby incorporated by reference in its entirety.

FIELD OF THE INVENTION

The invention pertains to apparatus and methods for a hoist to lift items. More particularly, the hoist motor is mounted without installation of electrical wiring. The motor is driven by a power source from a portable control unit.

BACKGROUND OF THE INVENTION

There are currently various types of hoists and winches that are commercially available. There are three main categories: mechanical, electrical and pneumatic. With the mechanical devices, the user is required to provide the force necessary to operate the hoist. In the electrical devices, an electrical system of a selected voltage is installed and connected to the hoist. The pneumatic devices use air or liquid to drive the motion. Both the electrical and pneumatic systems require a permanent connection to the power source. The permanent connection to power makes their installation expensive and cumbersome especially when multiple hoists need to be installed.

SUMMARY OF THE INVENTION

In general, the present invention provides a hoist that is powered by a detachable power unit. A hoist system includes a motor assembly having a load-moving member, a motor for moving of the load-moving member, and a first portion of a mating power connector coupled to said motor; and a separate power unit having a second portion of the mating power connector and a power coupling capable of coupling the second portion of said mating power connector to a power source.

A second embodiment of the hoist system includes a motor unit and a separate power unit. The motor unit has a motor, a spool driven by the motor, a flexible load-moving or suspending member attached to the spool and capable of being wound thereon and a first portion of a mating power connector. The power unit has an elongated body, a second portion of the mating power connector located at or near one end of the body, a switch located at or near the other end of the elongated body and a power source.

The load-suspending member may be formed of flexible, flat webbing.

The power source for the power unit may be a rechargeable battery pack. A charging station may be included to provide a recharging site for one or more power units and/or one or more independent battery packs. Alternately, the power source may be an AC outlet or AC wiring.

The hoist system may include an automatic cut-off having a pivoting lever with an opening surrounding the load-moving member, a stopper connected to the load-moving member and a cut-off switch located such that when the stopper reaches the lever, the stopper pushes the lever to engage the switch.

The hoist system may also include a solenoid and brake, wherein the solenoid moves the brake between a braking position and a released position.

The hoist system may also include one or more of the following: flat webbing forming the load-moving member, mounting hardware to connect the motor unit to a support structure, one or more planetary gears used to drive the spool.

An example method for moving loads includes the steps of using a load moving system having a motor assembly with a motor for moving a load-moving member, and a motor assembly power connector coupled with the motor and a separate power unit having a power unit power connector coupled to a power source; temporarily contacting the motor assembly power connector and the power unit power connector to provide power to the motor; completing a move of the load-moving member; and separating the motor assembly power connector and the power unit power connector. If desired, the power unit power connector may then be used to perform the same method on one or more additional motor assemblies.

The hoist embodiments disclosed here are easy to install. The only limitation on location and installation is the support structure needs to be able to withstand the amount of weigh to be suspended from the hoist. No installation of over-head electrical wiring electrical is needed. This benefit is magnified if a series of hoists are used. For example, numerous hoist units may be quickly and easily hung on the ceiling, walls or other secure structure within a warehouse or other location using only a few basic tools. One or a small number of control units may be used to operate all of the hoists.

The hoist weight and size are reduced since the power components are not a permanent portion of the hoist unit. This makes installation easier, but also reduces the overall number of components necessary and therefore the costs in situations where multiple hoist units are used with a single or smaller number of power units.

Additionally, if the hoist is to be used primarily to lift under 200 pounds, the hoist can use a relatively small motor capable of being powered for significant time from a small, portable battery pack.

DETAILED DESCRIPTION OF THE INVENTION

In general, the present invention provides a hoist that is powered by a detachable power unit. A hoist system includes a motor assembly having a load-moving member, a motor for moving of the load-moving member, and a first portion of a mating power connector coupled to said motor; and a separate power unit having a second portion of the mating power connector and a power coupling capable of coupling the second portion of said mating power connector to a power source.

Figure 1:
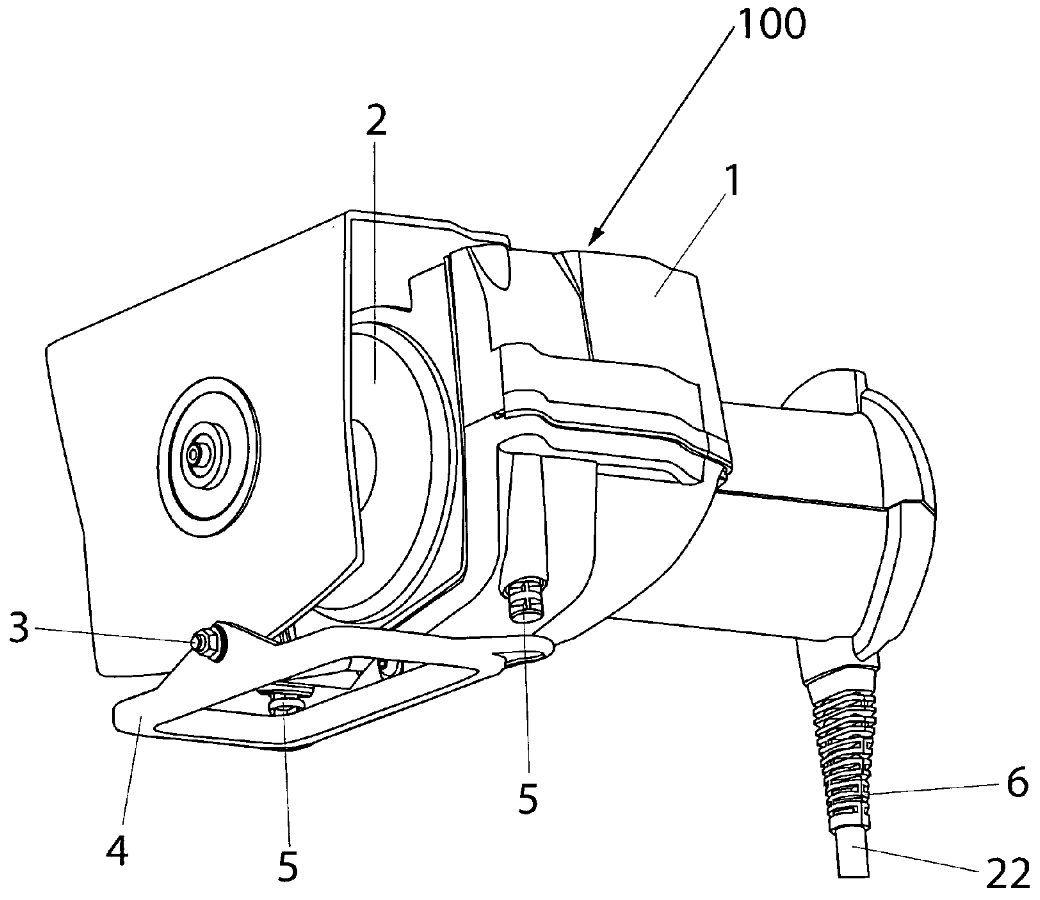
FIG. 1 is a perspective view of the hoist.
Figure 2:
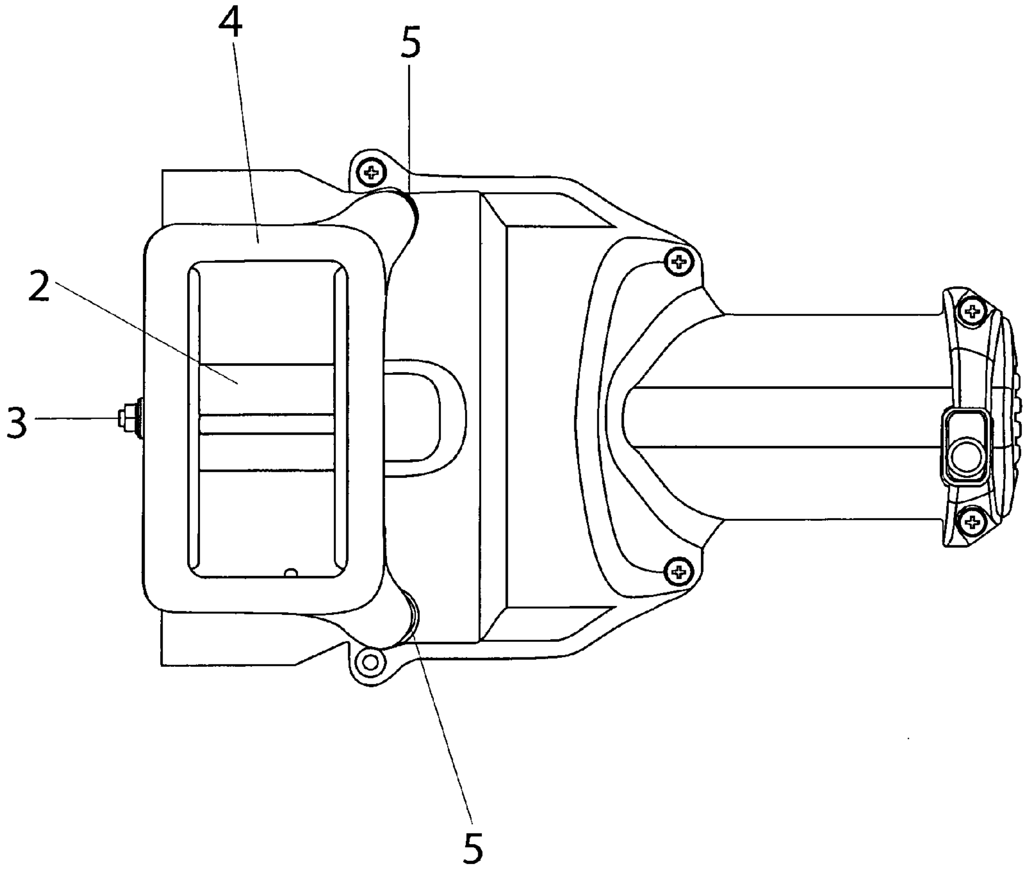
FIG. 2 is a bottom view of the hoist.

FIG. 1 is a perspective view and FIG. 2 is a bottom view of the hoist unit 100. The hoist motor 10 is located within a hoist housing 1. The motor 10 drives a spool 2 upon which webbing 7 or cable is wound. An optional multidirectional automatic cut-off system 110 is used to assure that a load is not raised above a safe level. A power cable 22 extends downward from the hoist motor 10 and has a power connector 40 located at the lower end, seen in FIG. 7. A strain relief 6 may be included to decrease the wear on the connection between the power cable 22 and the hoist casing 1.

An alternate embodiment could have the power connector 40 extending from or attached directly to the motor 10 or hoist housing 1.

Figure 13:
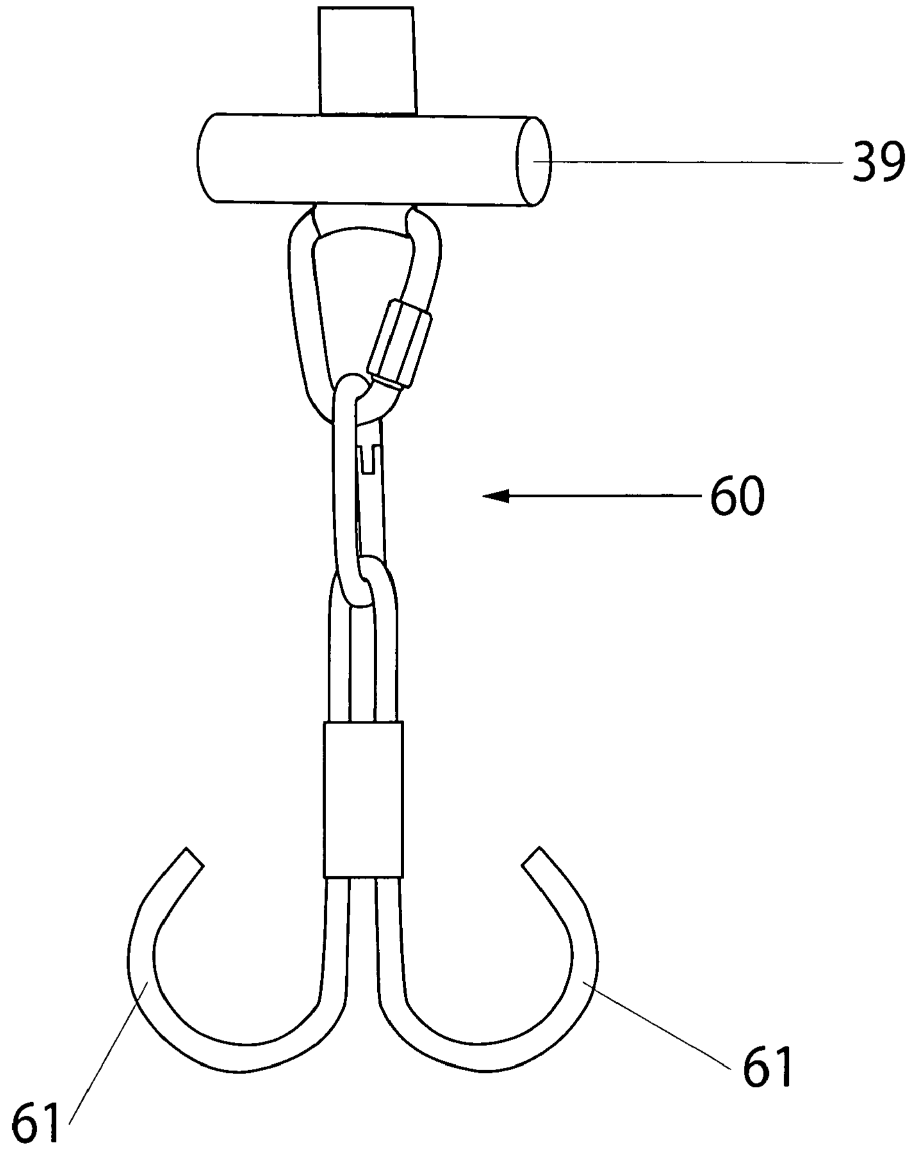
FIG. 13 shows a first hook configuration.

The example of a cut-off system 110 includes a lever 4, with a center pivot point 3 allowing it to hinge in both directions, and two switches 5. A stopper 39 at the lower end of the webbing 7, seen in FIG. 13, is shaped in such a way to push the lever 4 when the object has reached optimal height. In this embodiment, the system is designed to prevent a user from raising an object above the cut-off point, no matter which direction the webbing 7 is spooled, clockwise or counter-clockwise.

In an alternate version, the system could wind the webbing 7 onto the spool 2 in only one direction, in which case a single direction cut-off with a single switch could be used.

Figure 6A:
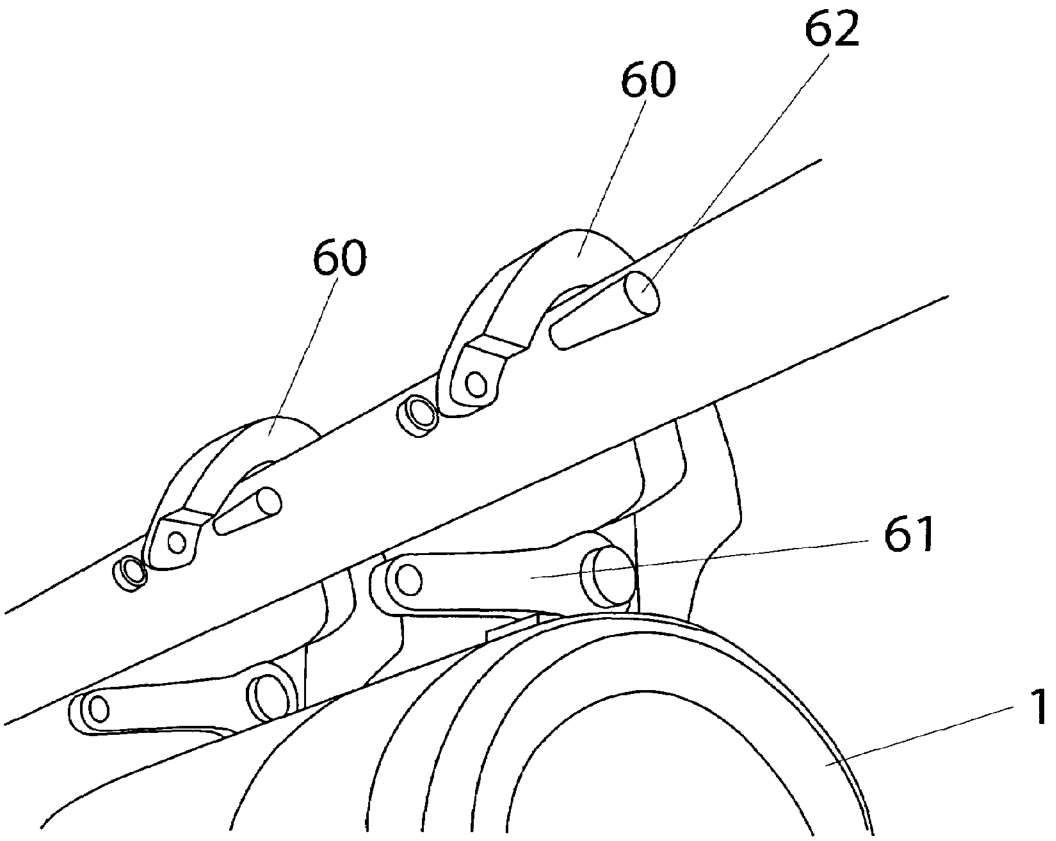
FIGS. 6A and 6B shows a hoist with hooks for hanging.
Figure 6B:
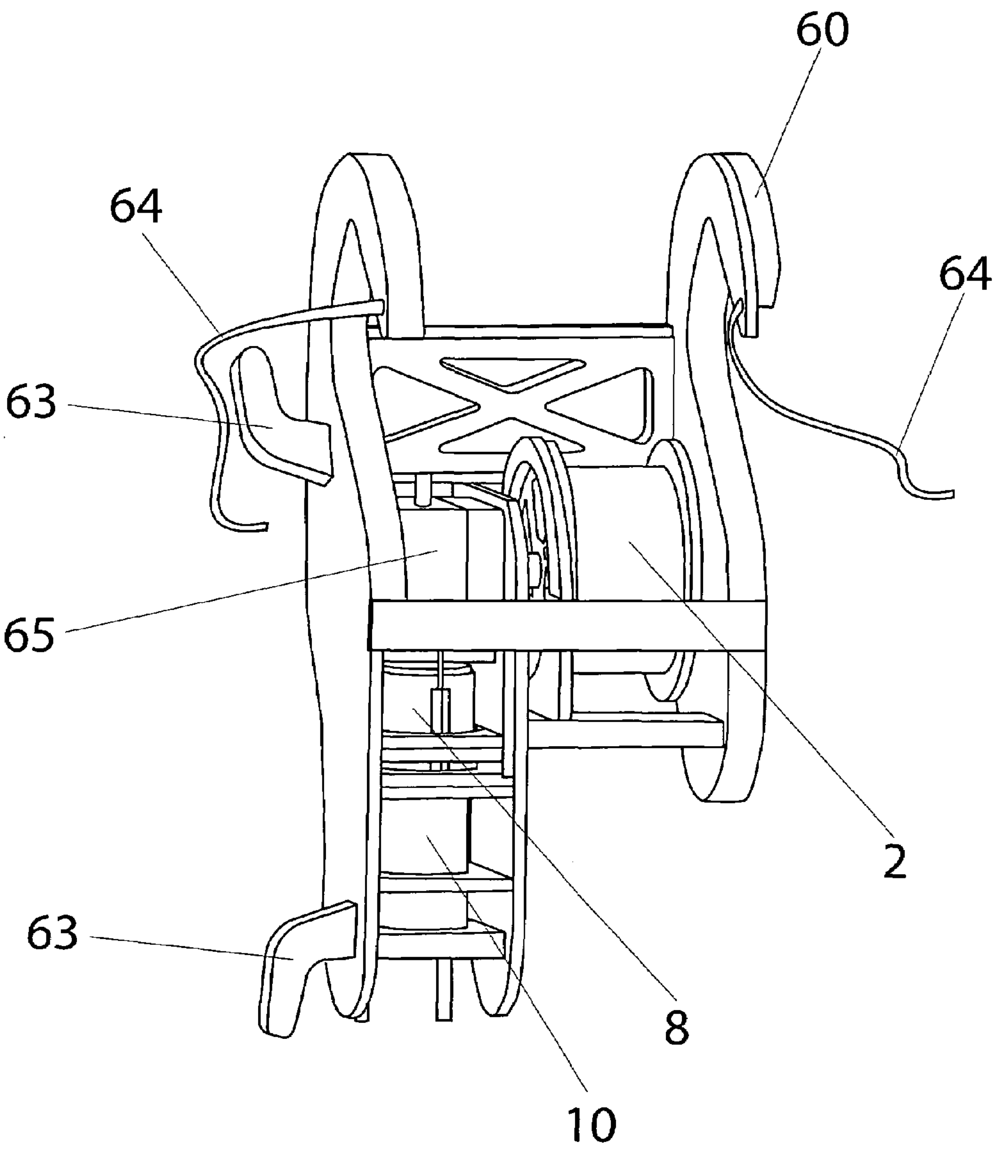

The hoist housing 1 is designed such that the power cable 22 with the power connector 40 can be wrapped around the housing 1 or hooks 63 on the housing 1, as seen in FIG. 6B, may be used to adjust the height at which the power connector 40 hangs. This allows the hoist unit 100 to be hung and operated from various heights. Alternately, the hoist power connector cable 22 could be attached to the hoist mounting beam at a variable distance away from the hoist unit 100; in effect using up some of the cable 22 to allow the hoist power connector 40 to hang at the appropriate height.

Optionally, several hoist units 100 could be daisy-chained together such that each would share a common power source at the end of the chain. An electronic controller could be used to address the particular unit to be raised or lowered. This would preferably be an AC motor driven hoist.

Figure 3:
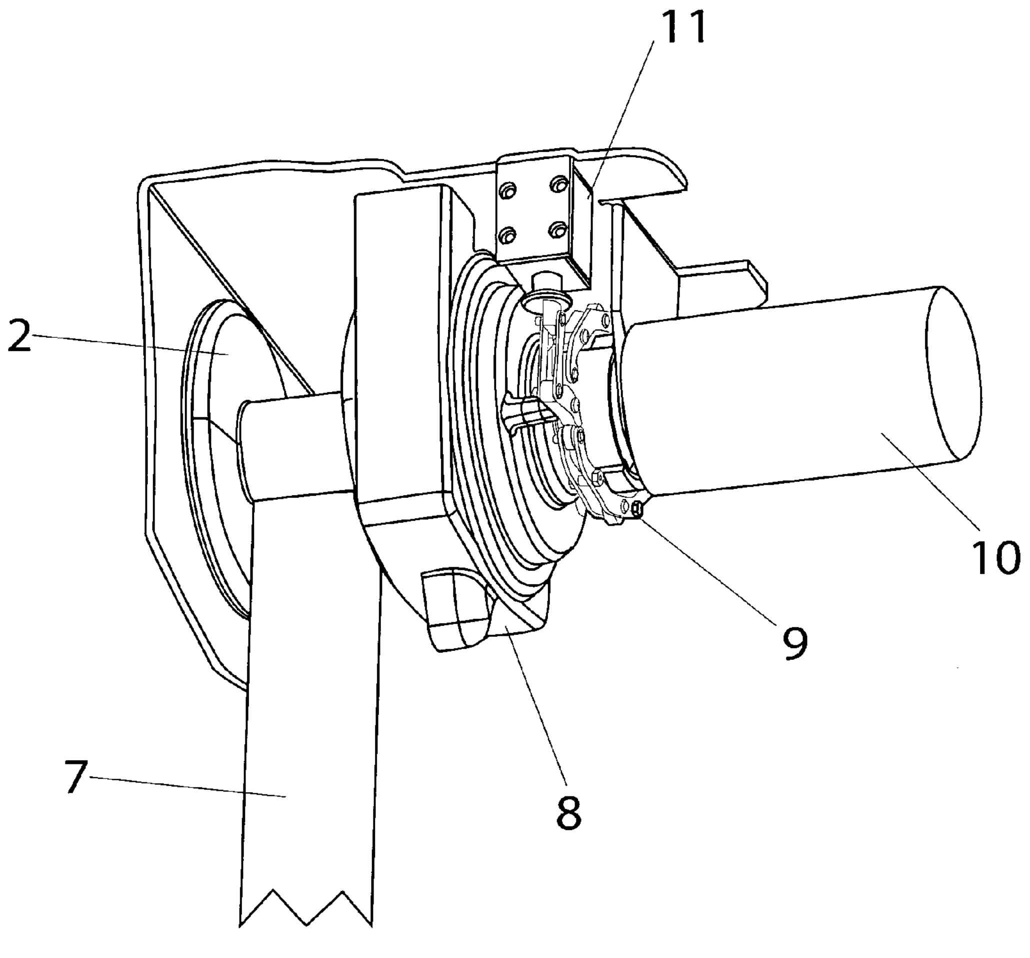
FIG. 3 is an internal view showing the motor, brake, gearbox and spool.

FIG. 3 is an internal view showing the motor 10, brake 9, gearbox 8 and spool 2. In this example, raising and lowering of a load is accomplished by means of a DC powered motor 10. The power from the motor 10 may be geared down by means of a gear system. Although other types of gear systems, such as worm gears, may be used, the embodiment shown uses a two-stage planetary gear system. One advantage of a planetary gearbox is its efficiency.

After the user has lifted the object to the desired height, it is necessary to lock the spool 2 to prevent the object from lowering due to its own weight. One example method used to lock the spool 2 is to connect the motor 10 leads. One way to connect the leads may be performed by the hoist power switch 36, seen in FIG. 12A. The internal wiring of the switch 36, located in the remote power pole 120, can be configured such that when the switch 36 is in the neutral position, both motor leads are connected to the negative lead of the battery. Another way to connect the leads may be located in the hoist power connector 40, seen in FIG. 7. A switch 21 in the hoist power connector 40 shorts the motor leads once the user removes the remote power unit 120 and disconnects the short once the remote power unit 120 is put back in place. If both of these configurations are present, the load will be securely held in place until the user activates the motor 10 and thereby moves the object up or down.

Additional braking may optionally be added to the hoist system by using a solenoid 11 and spring combination to apply pressure, thereby resisting rotation of the motor shaft when no power is applied to the motor 10. Once power is applied to the motor 10, the solenoid 11 and spring combination releases the pressure and allows the motor shaft to rotate. This configuration resists motion on the motor 10 side of the gearbox 8. When resistance is provided on the motor 10 side, less force is needed to prevent spool 2 rotation. When resistance is provided on the spool 2 side additional resistance is required to prevent spool 2 rotation.

Alternately or in addition to the braking and holding devices above, a further safety mechanism, such as a post or other mechanical interlock may extend through openings in the spool edge when no power is connected to the motor 10. In one embodiment, the post would be automatically retracted or moved out of the way when power is connected, but would be deployed when the power was lost, thereby assuring that no significant rotation of the spool 2 could take place when the power unit 120 is not connected.

Figure 4:
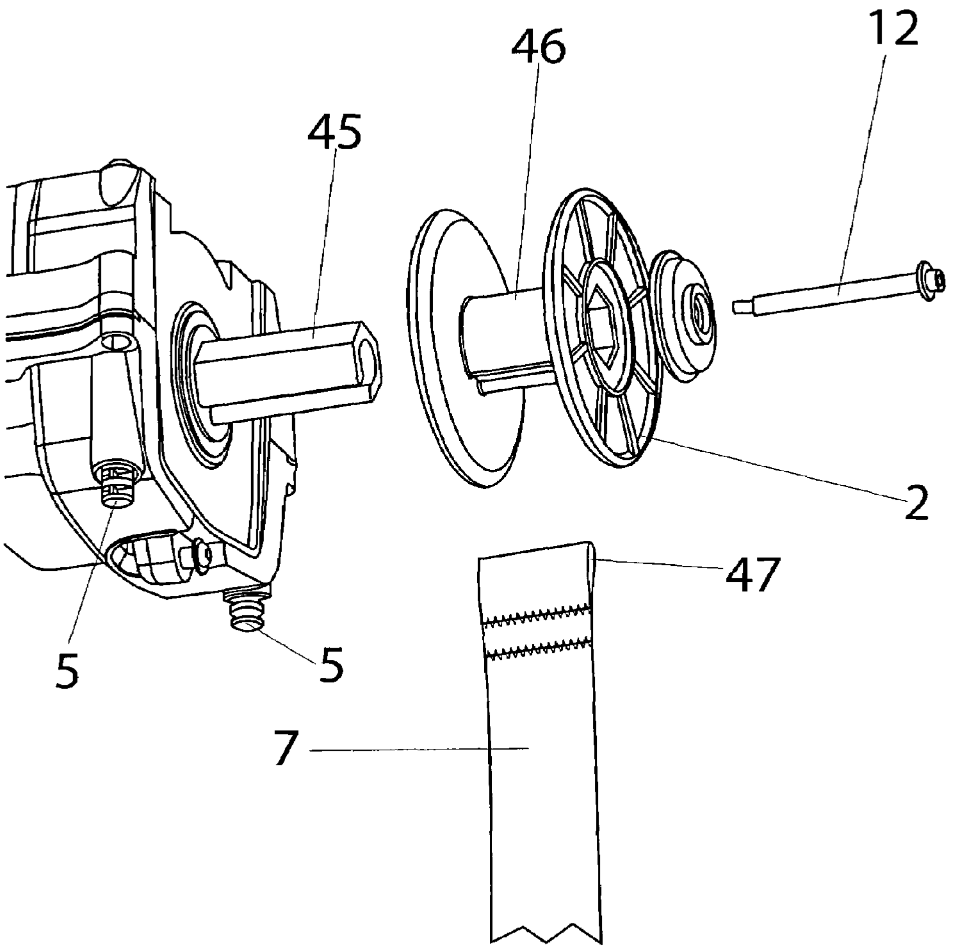
FIG. 4 is an exploded view of the spool.

FIG. 4 is an exploded view of the spool 2. The spool 2 may be made of any sturdy and fairly durable material, such as metal, wood, plastics, etc. In one embodiment, the spool 2 is made of plastic to reduce abrasion and noise. A flexible load-moving or suspending member 7 may take the form of webbing, cable, rope or other materials that is used to move and/or suspend the load and wind onto the spool 2. In the embodiment shown, webbing 7 is used to prevent failure due to tangling or kinking. Webbing 7 also has the benefit of tending to prevent the object from rotating while being raised and lowered as may occur when cable or rope is used. Lack of rotation reduces the danger of a spinning load accidentally hitting a person or other object and may also aid the user by providing consistent hanging, loading and unloading orientations. Additionally, the webbing 7 wraps over itself, thereby consistently increasing the functional diameter of the spool as it winds. Consequently, the lifting speeds up as the object is raised and slows down as the object is lowered. A slower speed close to ground level allows safer and more precise lowering as the object approaches the ground.

In one embodiment, the spool 2 is also designed to make the webbing 7 easily replaceable by user. The end of the webbing 7 extends through an opening in a spool post 45 and spool core 46 wall. A removable threaded pin 12 extends through an opening 47 in the end of the webbing 7 and secures the end of the webbing 7 within the center of the spool 2.

In other embodiments, other mechanisms may be used to raise and lower a chain, rope, cable or telescoping arm, which is supporting the load. For example, the load may be lifted by reeving or passing a rope or rod through a hole, ring, pulley or block. Another example embodiment would use the motor to drive a sprocket gear, which would in turn engage a chain, thereby raising and lowering the load end of the chain. The loose end of the chain may be left dangling or drop into a collection chamber to keep it from tangling with the load and other objects.

Figure 5A:
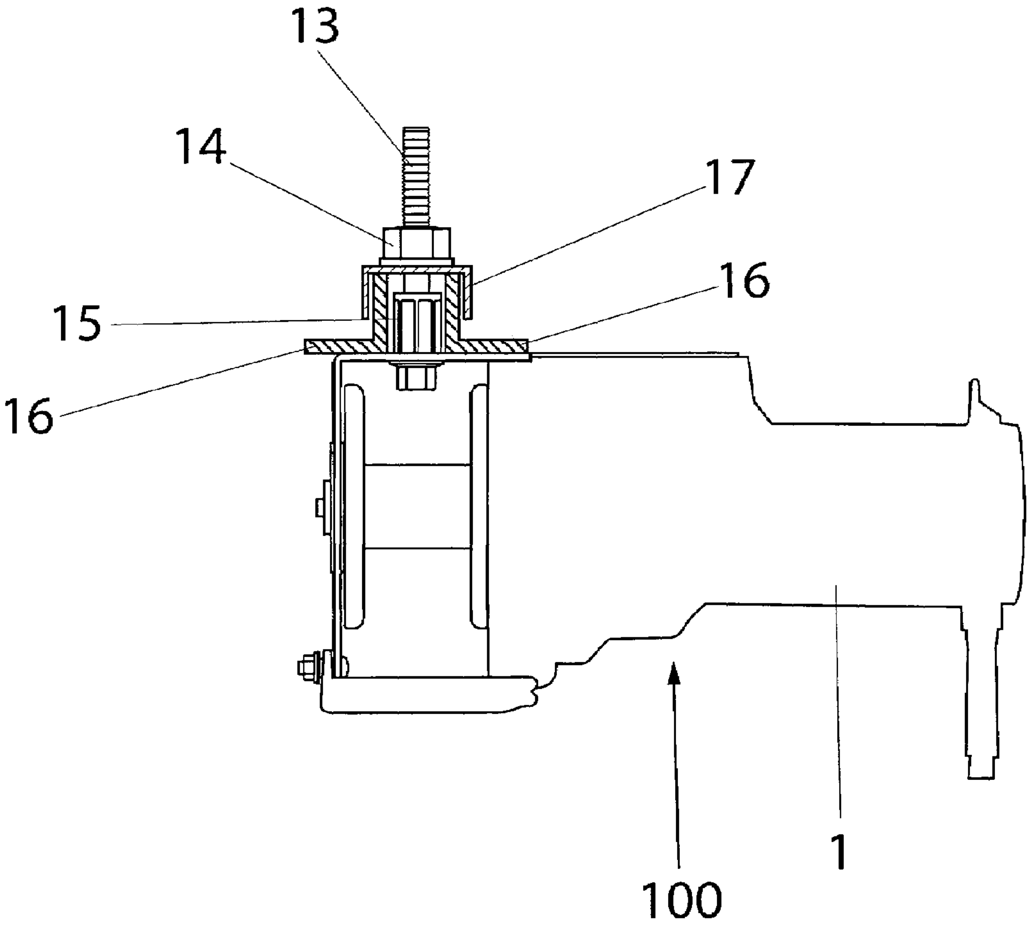
FIGS. 5A and 5B show the hoist mounted to an angle iron bracket and a glu-lam beam.
Figure 5B:
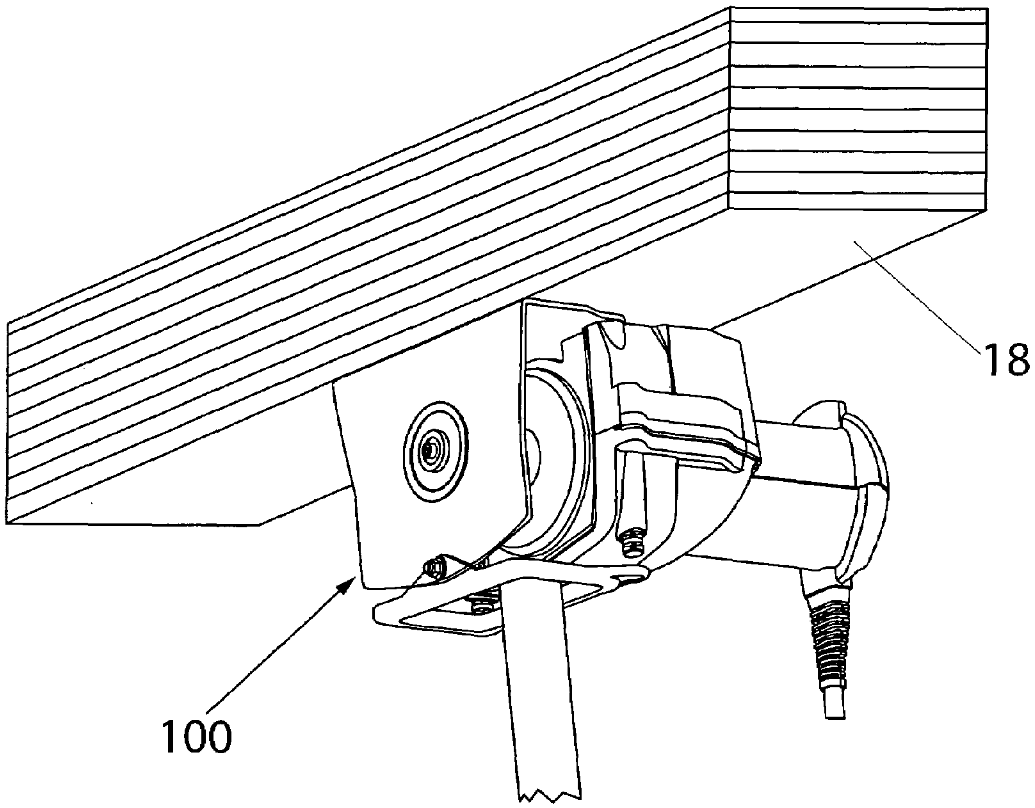

The hoist unit 100 may be mounted to virtually any type of structure capable of supporting whatever object is to be held. In the embodiment shown, mounting holes are located through the hoist housing 1 as part of the hoist body to allow the hoist unit 100 to be mounted to various wall, ceiling and structural features. The holes are spaced to match with holes in typical perforated beams. Custom mounting hardware may then be bolted to the hoist 100. A mounting kit may be added to the hoist that includes hardware for mounting to L beams, box beams, glu-lam beams, as well as various other common large building ceiling structures. FIGS. 5A and 5B show a couple of the options for mounting the hoist. In FIG. 5A, the hoist 100 is mounted to a beam formed of L-shaped angle irons 16. In this case a spacer 15, nut 14, bolt 13 and a C-shaped washer 17 are used. The configuration and specific hardware used would vary depending on the shape and design of the beam to which the hoist 100 is being mounted. Another mounting example is show in FIG. 5B, which depicts the hoist mounted to a glu-lam beam 18.

Alternatively, the hoist 100 could have a simple hook system that allows it to be installed without tools, as seen in FIG. 6A. In this version, a pair of hooks 60 would extend up from the casing 1 and could be used to hang the hoist 100 on a beam or other elongated member. For further security, an optional pivoting arm 61 could be used to close the hook opening and assure that the hoist could not be inadvertently pushed off the bar or beam. Various mechanisms may be used to hold the pivoting arm in place, including but not limited to, springs, hooks, detents, friction fitting, pins 62, screws and nuts.

Optionally, a leash or tether 64, seen in FIG. 6B, may be added to the unit as a security measure in case the primary mounting method or hardware fails. The leash or tether 64 could take several forms. For example, one or more reinforcing wires or cables 64 may be looped around the support beam.

In addition, an optional worm gear 65 may be used to reduce the speed and prevent back drive.

Figure 7:
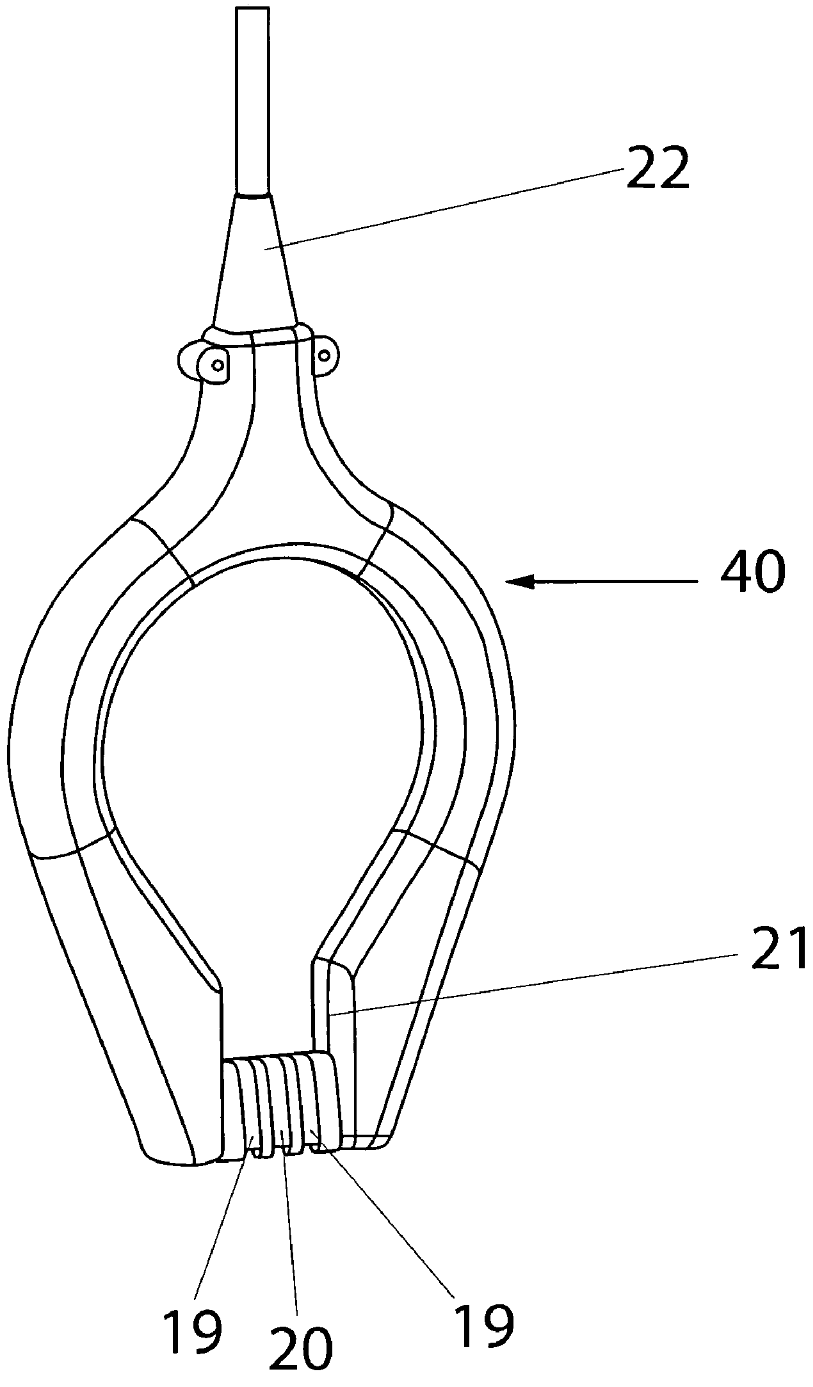
FIG. 7 is a perspective view of the power connector for the hoist.

FIG. 7 is a perspective view of the power connector 40 for the hoist 100. The hoist power connector 40 has three contacts, one contact being negative 20 and the other two being positive 19. This allows the hoist power connector 40 to be connected from either direction, while maintaining the polarity needed to keep the switch direction constant. Alternatively, the hoist power connector could have one positive contact and two negative contacts. Another variation could use two leads, one positive and one negative or ground.

Figure 8:
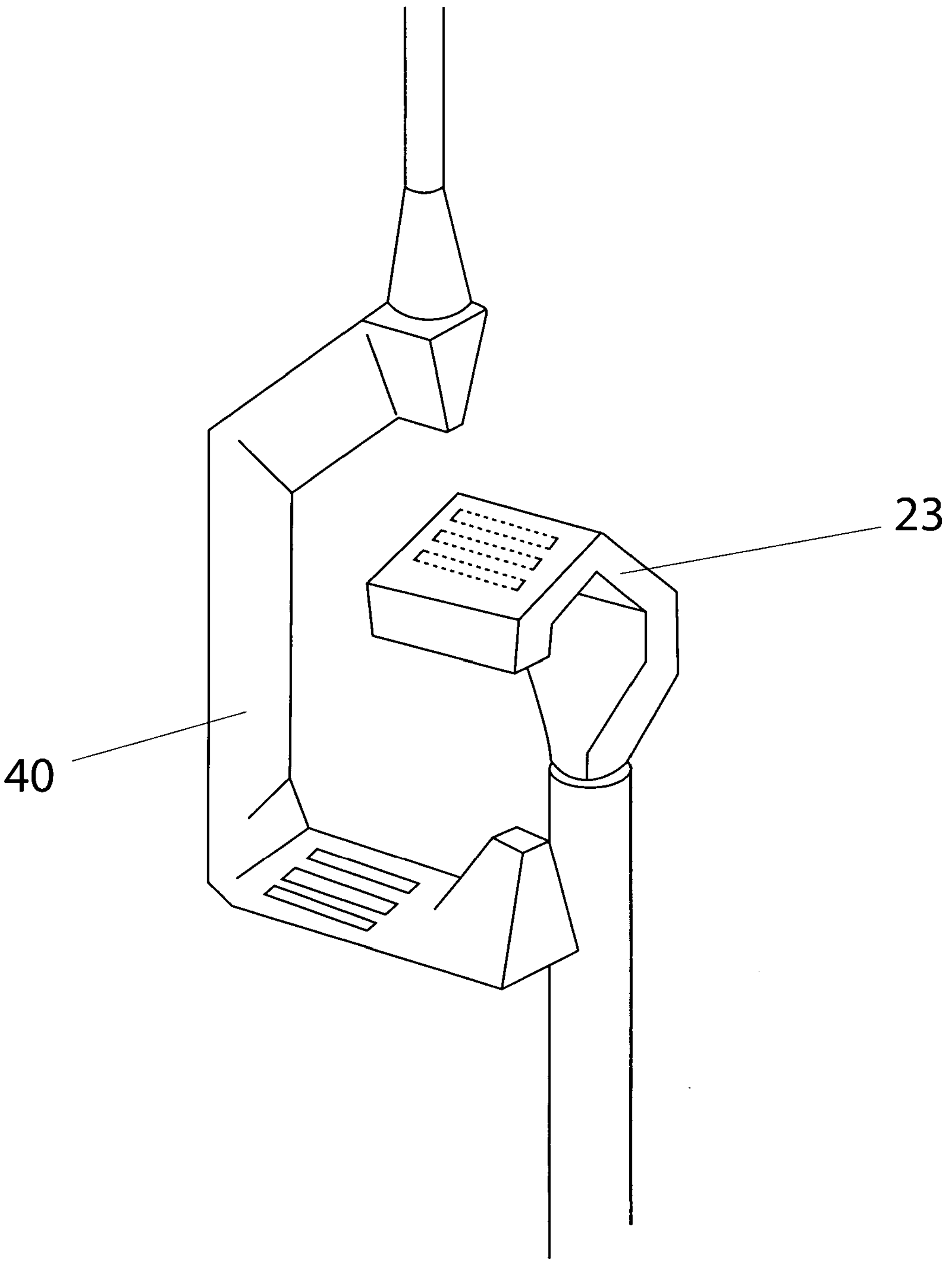
FIG. 8 is second embodiment of the power and hoist connectors.

FIG. 8 shows a variation of the connection between the power unit 120 and the hoist connector 40. In this embodiment, the hoist connector 40 and the power unit connector 23 are both hook-shaped.

Alternative embodiments could have a hoist power connector shaped like an inverted cone with a slot, such that the connection point on the remote power pole would slide down the wire until it hits the cone to make contact. The remote power pole connection point would be Y-shaped to reach around the top of the inverted cone, thereby allowing the hoist power connector to be approached from any direction.

Figure 9A:
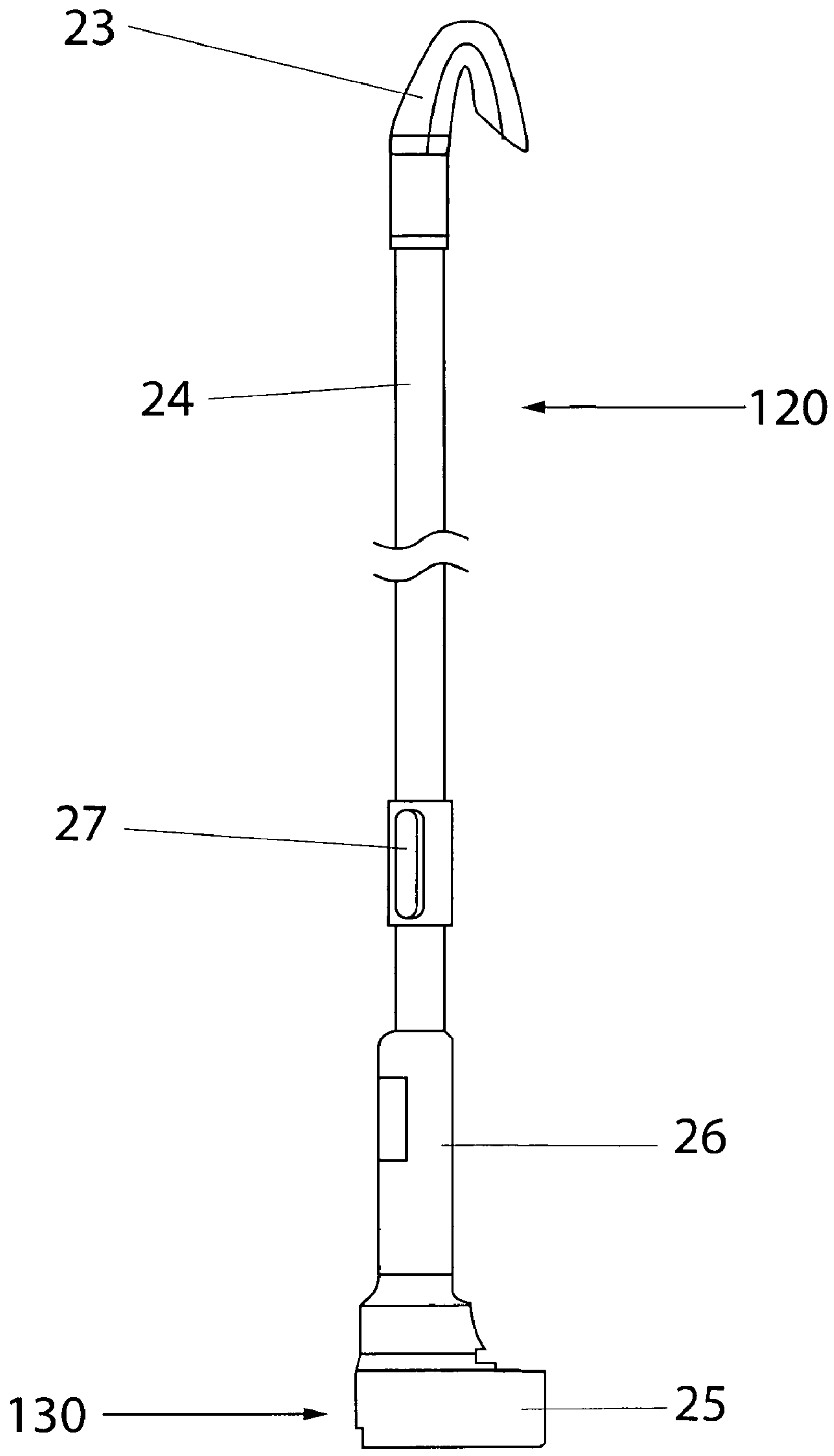
FIGS. 9A and 9B are side and detail views of the power unit.
Figure 9B:
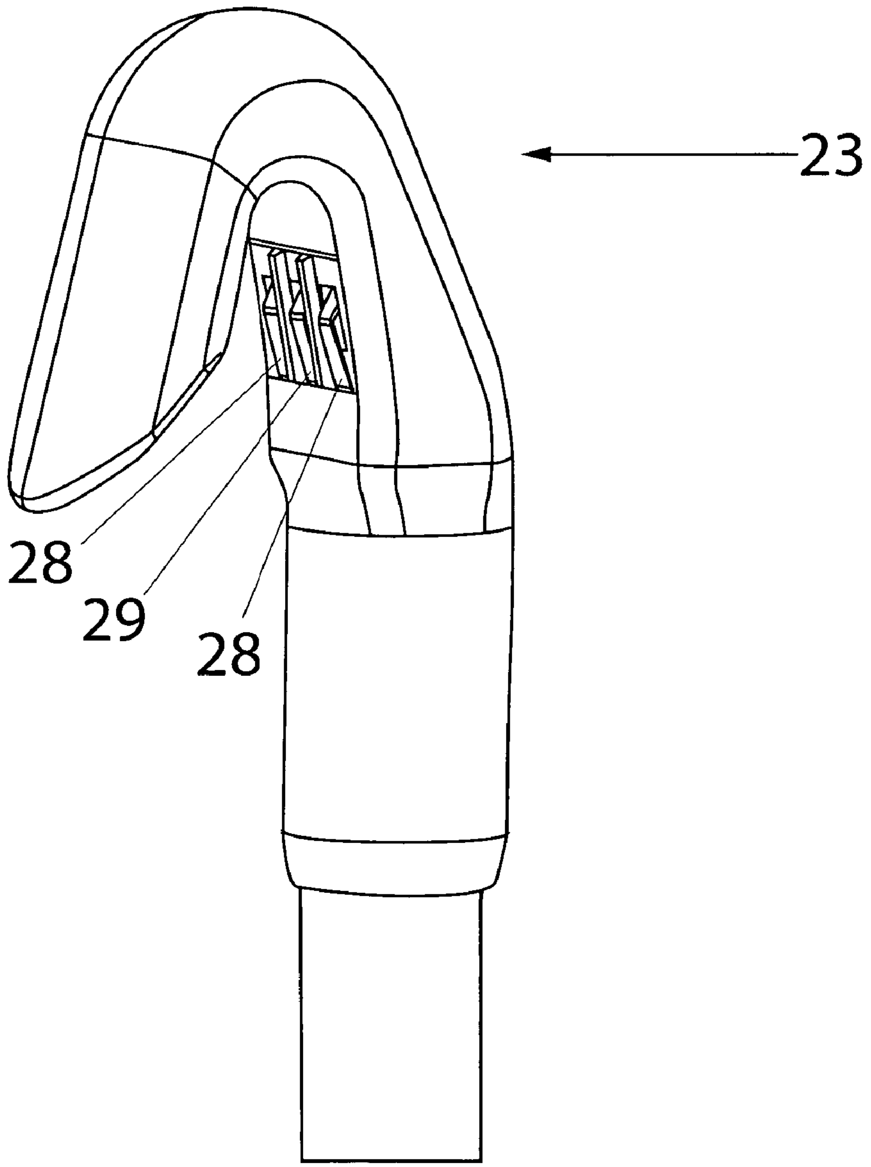

FIG. 9A is a side view of the power unit 120, and FIG. 9B is a detail view of the power connector 23 from the power unit 120. The power unit 120 takes the form of an elongated pole 24 having a coordinating power connector 23 configured to engage the hoist power connector 40, a set of controls 130 on the handle 26 and a battery pack 25. The power unit 120 incorporates a double pole triple throw switch to short the power pole contacts 28, 29 (which connect to both motor leads 19, 20 when the power unit 120 is attached to the hoist unit 100) to the negative terminal of the battery pack 25 when in the neutral position.

A current limiting fuse may be installed in the power unit 120 and is placed in series with the battery pack 25. The fuse prevents a user from sending too much current through the system, thereby preventing excess current from forcing the hoist 100 to lift a load beyond its load rating and causing harm to the user, electrical failure or damage to the batteries 32.

In an alternative version, a clutch inside the hoist 100 could be used as a load limiter.

Figure 10A:
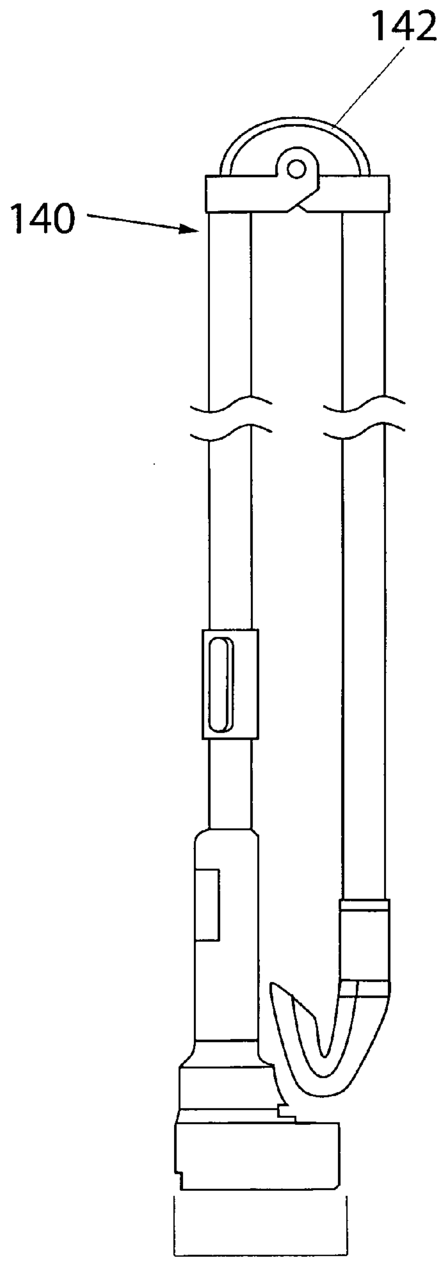
FIGS. 10A, 10B and 10C are embodiments of the power unit that are collapsible.
Figure 10B:
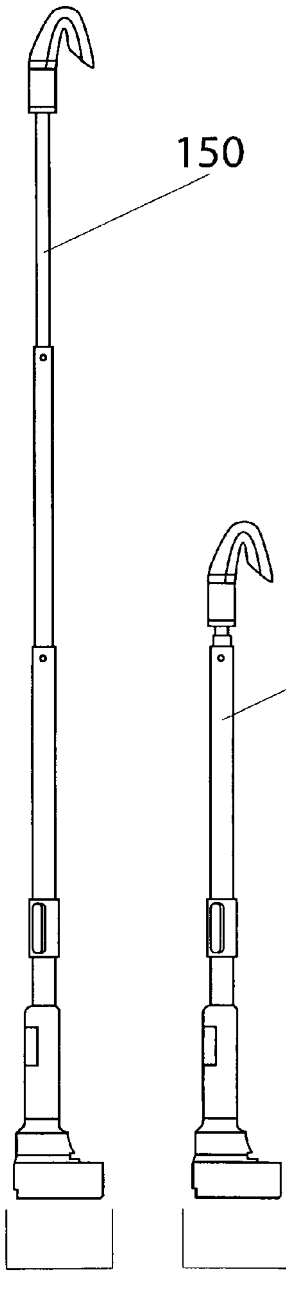
Figure 10C:
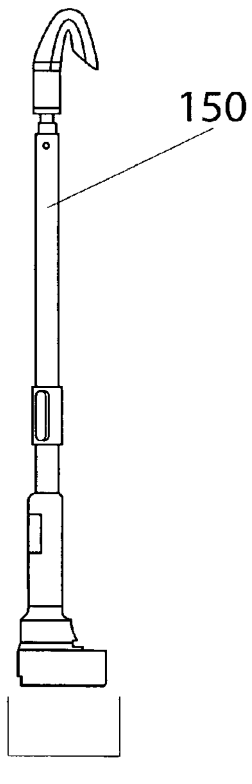

FIGS. 10A–10C are embodiments of the power unit that are collapsible. In FIG. 10A, the power unit 140 is foldable. In this case, some extra length of the internal wiring 142 is required to allow for the wiring to extend around the opening created by the fold. In FIGS. 10B and 10C, the power unit 150 telescopes. The unit 150 could have from 2 to any number of pieces forming the telescopic lengths. In the version shown, the power unit 150 has three sections, such that the when collapse, as seen in FIG. 10C, the unit is a somewhat over one third of the length of the extended power unit 150.

Figure 11:
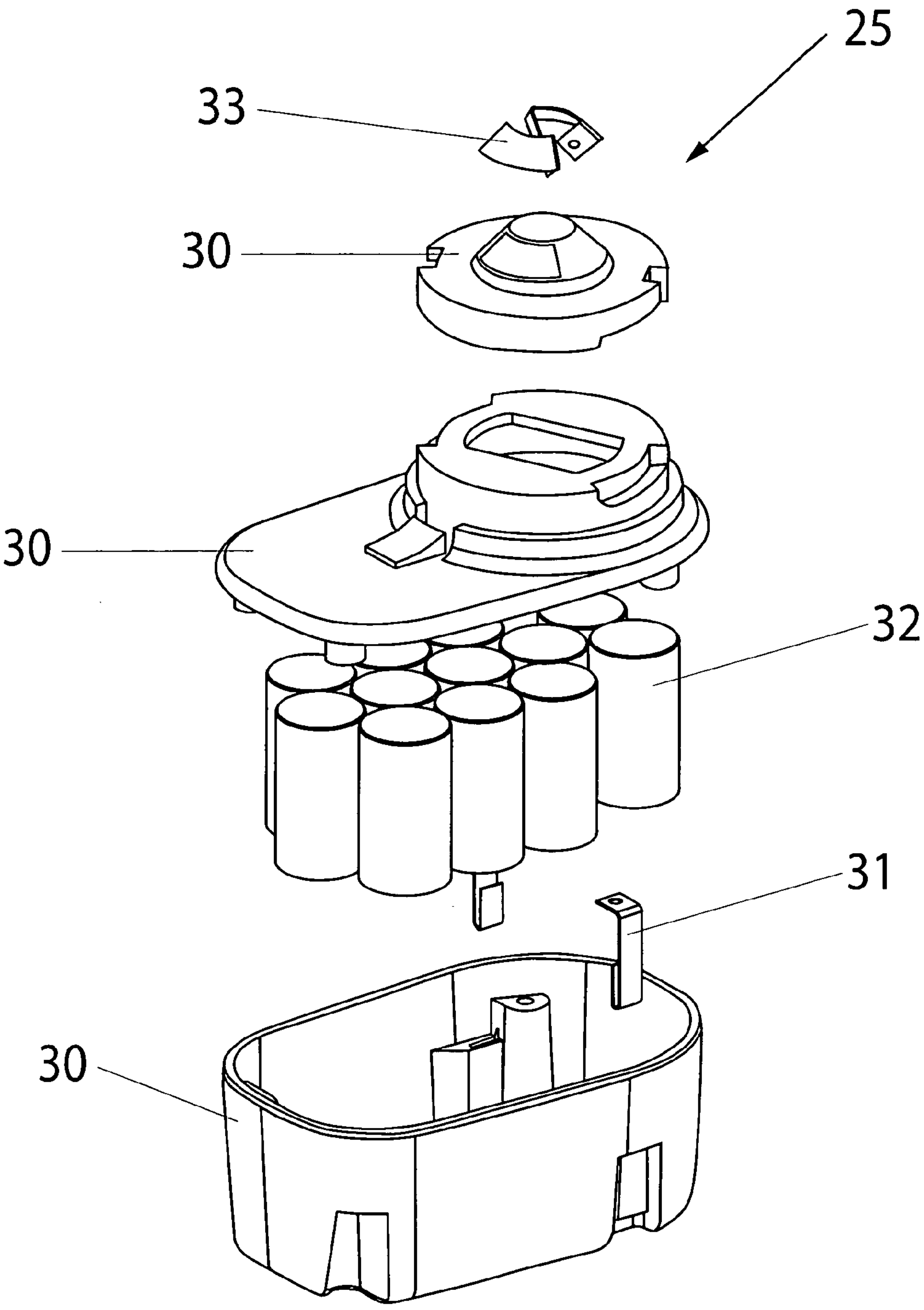
FIG. 11 is an exploded view of the battery pack.

FIG. 11 is an exploded view of the example battery pack 25, which in the rechargeable embodiment uses either a NiMH pack or a NiCd pack. Various numbers, sizes and arrangements of cells 32 may be used depending on the power needs of the motor 10 and loads to be lifted. In the example shown, a set of 15 Sub C cells 32 wired in series and placed inside an insulated housing 30 is used, for example plastic. One or a series of electrical contacts 33 are used to connect the battery pack 25 to the rest of the power unit 120.

Figure 12A:
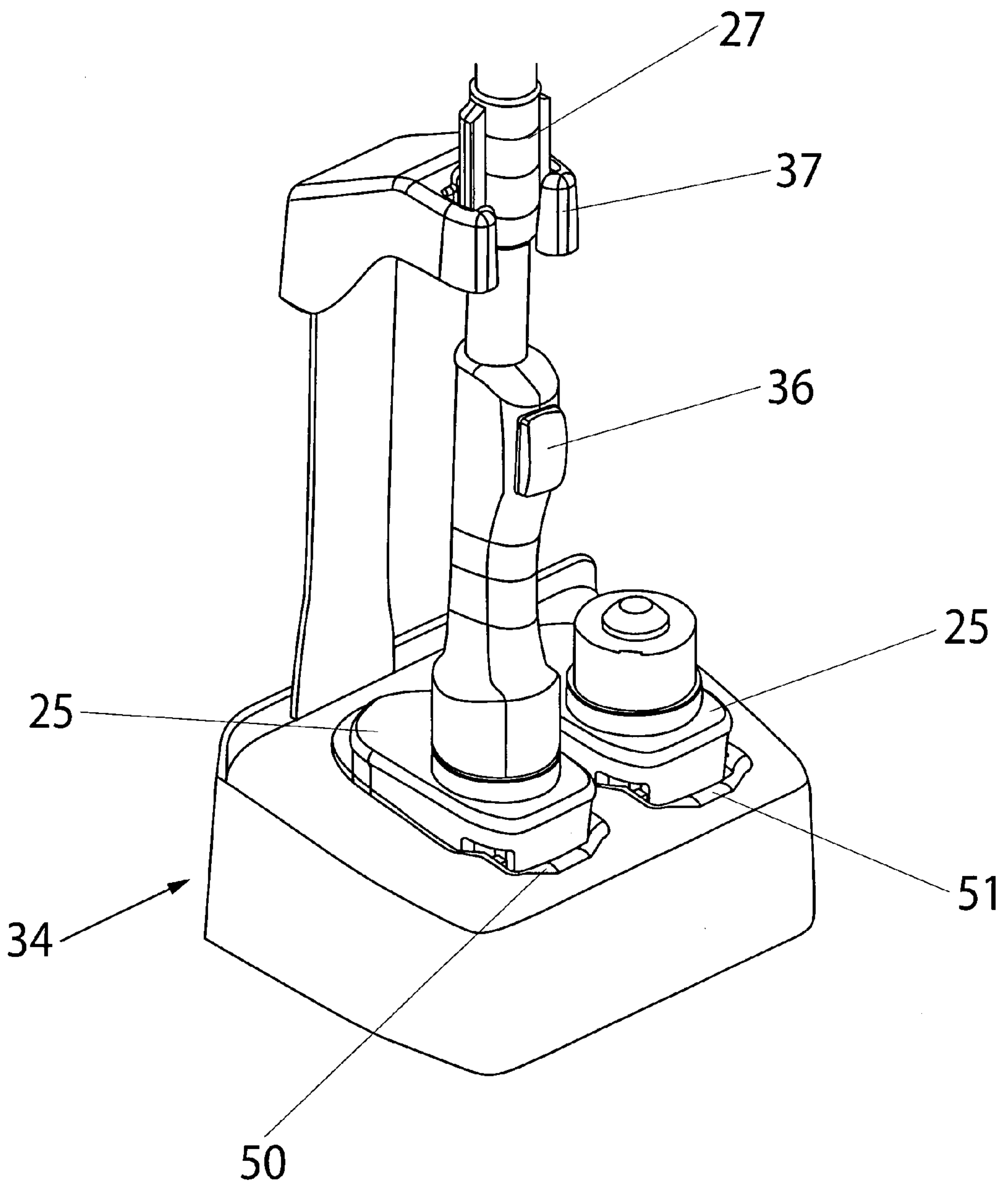
FIGS. 12A, 12B and 12C are views of charger units.
Figure 12B:
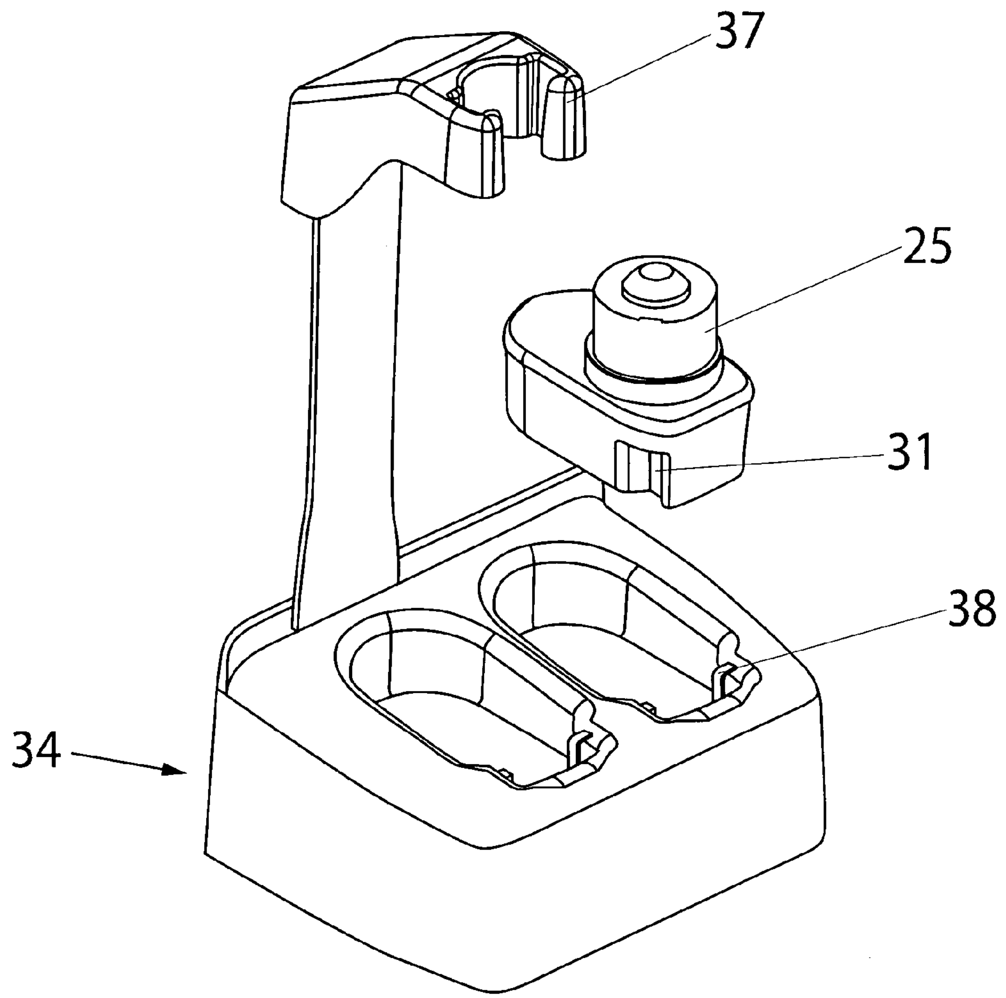

FIG. 12A is a perspective view of the charger unit 34 with two battery packs 25 in place, and FIG. 12B is an exploded view of the charger unit 34 with one battery pack 25. The charging unit 34 includes a body and circuitry 38 to rapidly peak charge one or two packs 25 simultaneously. The connection to the battery pack 25 is formed by a charging contact 31 located on the outside of the battery housing 30. There is a main bay 50 that accepts a battery pack 25 mounted to the power unit 120 and a second bay 51 that accepts a free battery pack 25. The main bay 50 has an arm and retaining clip 37 that engages the power unit support collar 27, which holds the pole 24 upright. The charger 34 can be mounted to the floor or to the wall. Other versions could have a single charging bay with or without the retaining clip 37 or additional charging bays to hold several power units or several free battery packs.

Figure 12C:
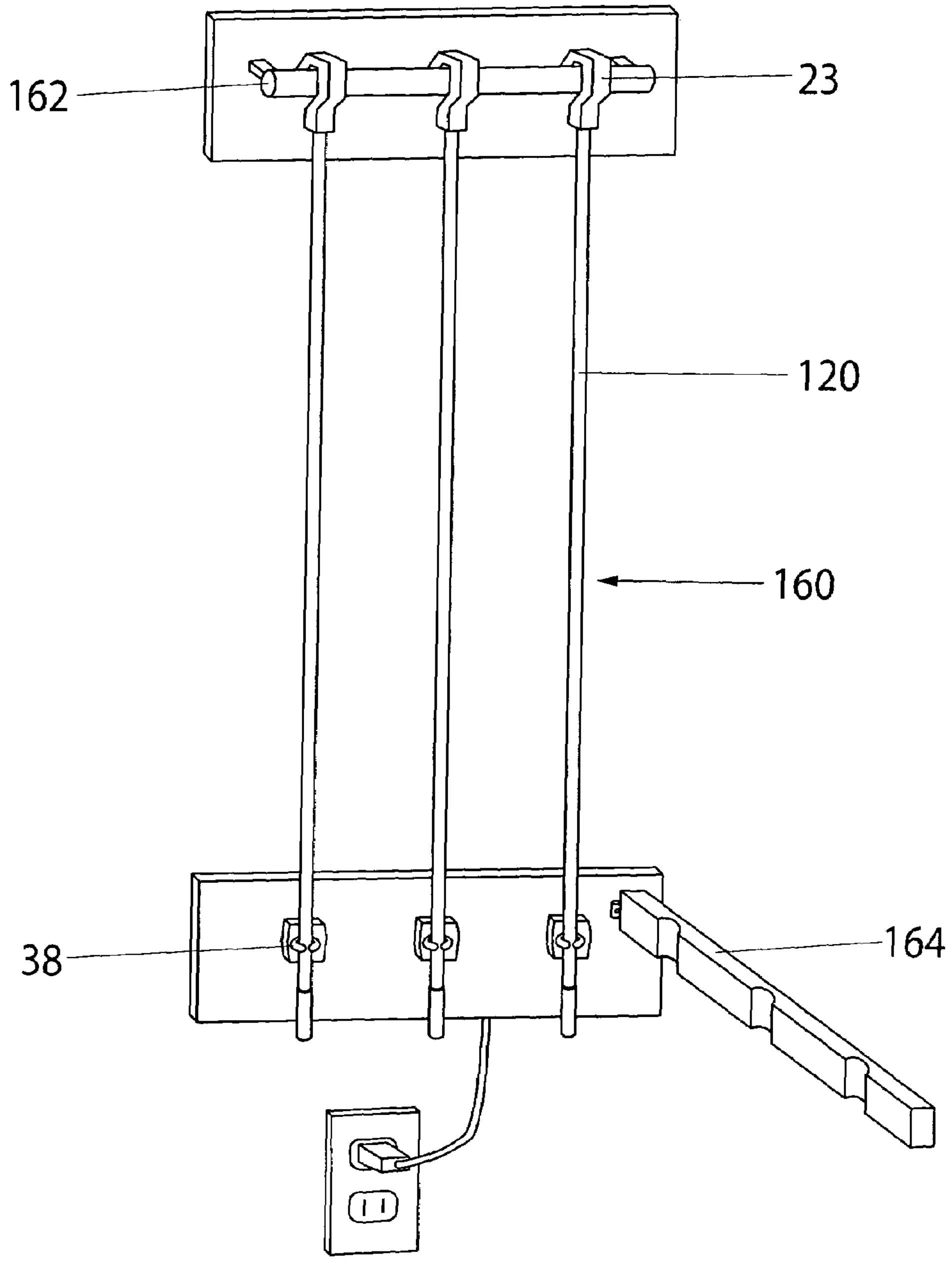

In FIG. 12C, a wall mounted charger unit 160 is shown. In this case, the power unit connector 23 is hooked over a bar 162. The battery contacts 31 of the power unit 120 are then leaned against the charger contacts 38. A latching bar 164 may be added to hold the power units 120 in place. If needed, the latching bar may have a locking mechanism to prevent unauthorized persons from accessing the power units 120.

Alternatively, the hoist could be driven by an AC motor. However, the AC version would require the hoist to be powered from an AC power source. One AC configuration would include a power unit that is plugged in a wall outlet or be installed in the building wiring. The corded control unit would then be used similar to the DC units discussed herein.

Another variation of the hoist could be pneumatically driven. An example of a pneumatic system would be connected to a compressed air source. The power connection would connect the compressed air to the hoist unit, and thereby provide the power to raise and lower the load.

Many different hooks and connectors and loading holding systems may be used with the hoist to hold virtually any type of object. The hook configuration and usage would be dictated by the particular needs of the user. The examples herein show a few of the possible options to hold bicycles. These are shown in FIGS. 13, 14, 15 and 16.

FIG. 13 is a double vertical hook 60, which may be formed of a bent metal rod with two hooks 61 that are bent past vertical.

Figure 14:
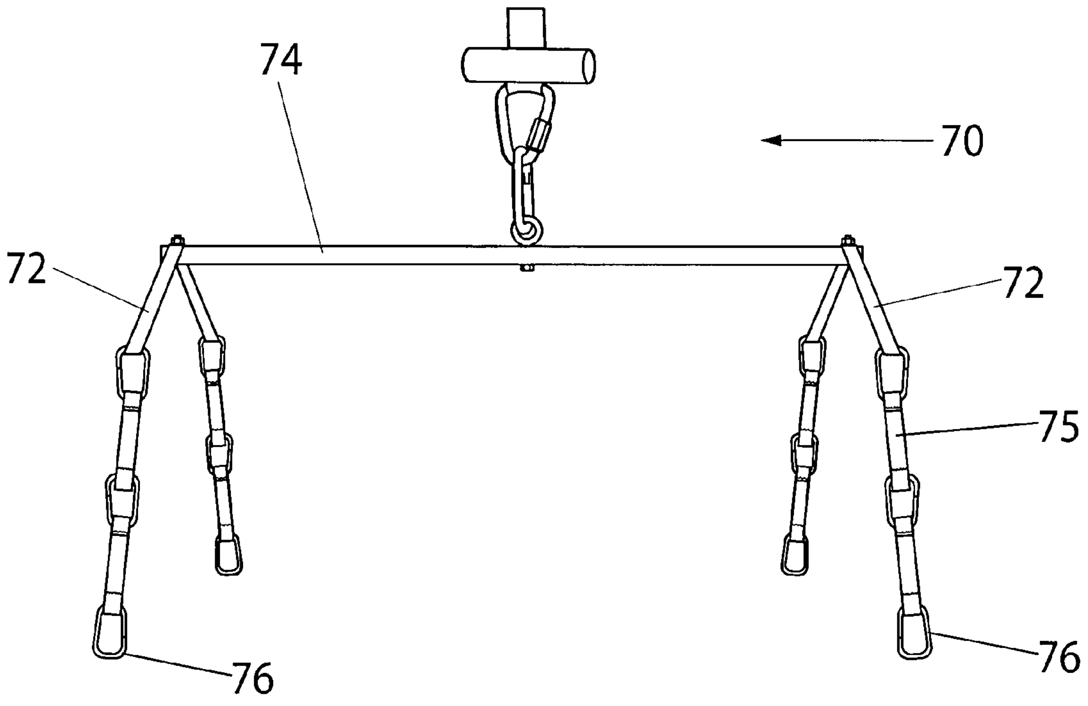
FIG. 14 shows a second hook configuration.

FIG. 14 shows a double horizontal hook 70, which includes two angled rods 72 spaced apart by a beam 74. At the end of each rod 72 is webbing 75 and carabiner 76. To hang a bicycle the user wraps one webbing 75 and carabiner 76 strap around the seat post and the second around the stem. Both bicycles in this case are held apart to prevent entanglement.

Figure 15:
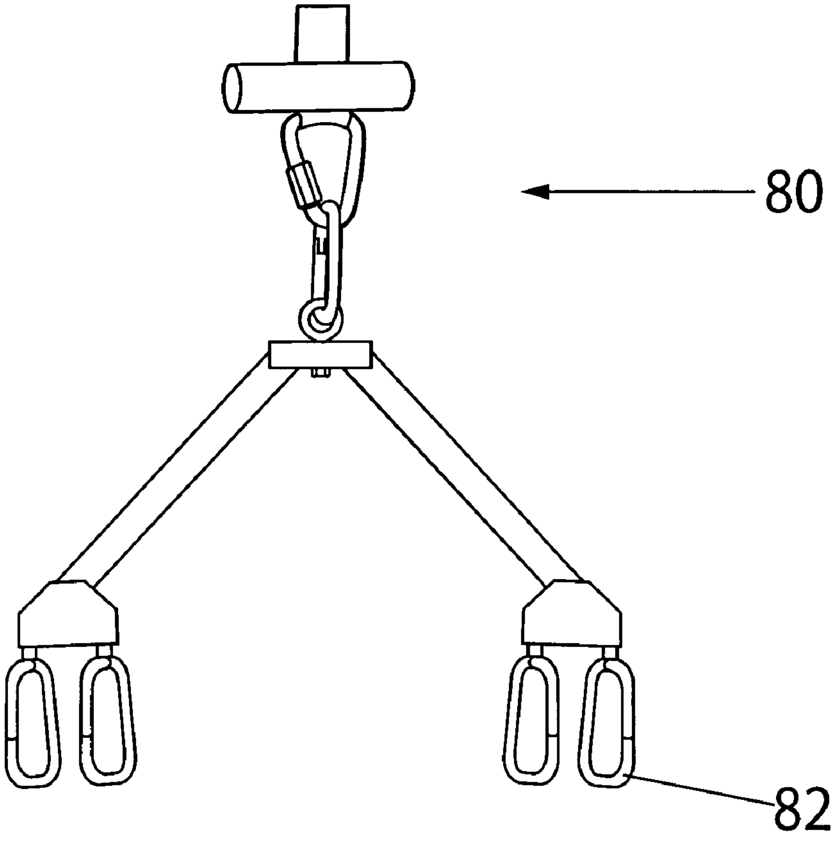
FIG. 15 shows a third hook configuration.

FIG. 15 shows a double angled hook 80 that holds two bicycles by the handlebars. An auto-locking clip 82 hooks under the handlebar and locks. Bicycles hang at approximately a 45-degree angle and are separated from each other to reduce entanglement and aid in unloading bicycle.

Any of the double hook versions may also be used to hold a single bicycle or additional hardware could be added to hold additional bicycles.

Figure 16:
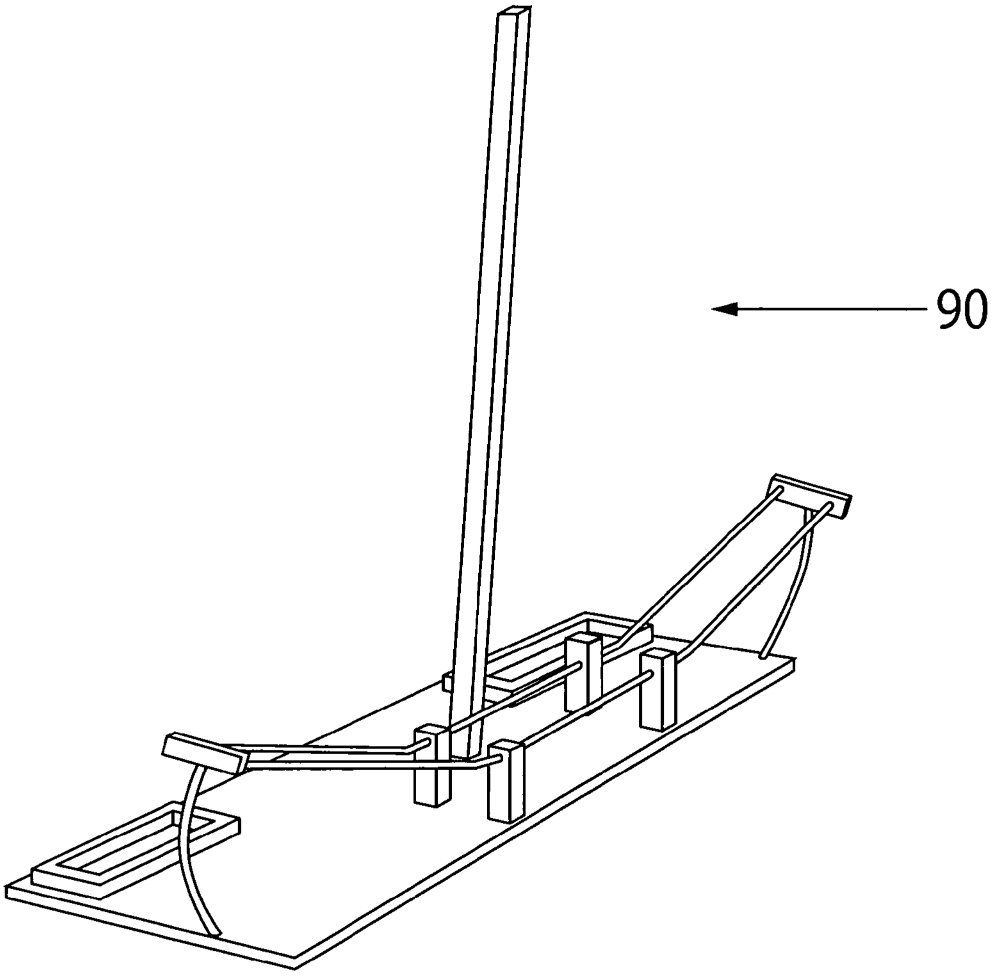
FIG. 16 is a perspective view of a loading platform.

FIG. 16 depicts a double horizontal platform 90 that allows a user to essentially roll a bicycle onto a platform 90 or rails. The bicycles in this case are held by a system similar to bicycle racks or car top bicycle carriers.

Figure 17:
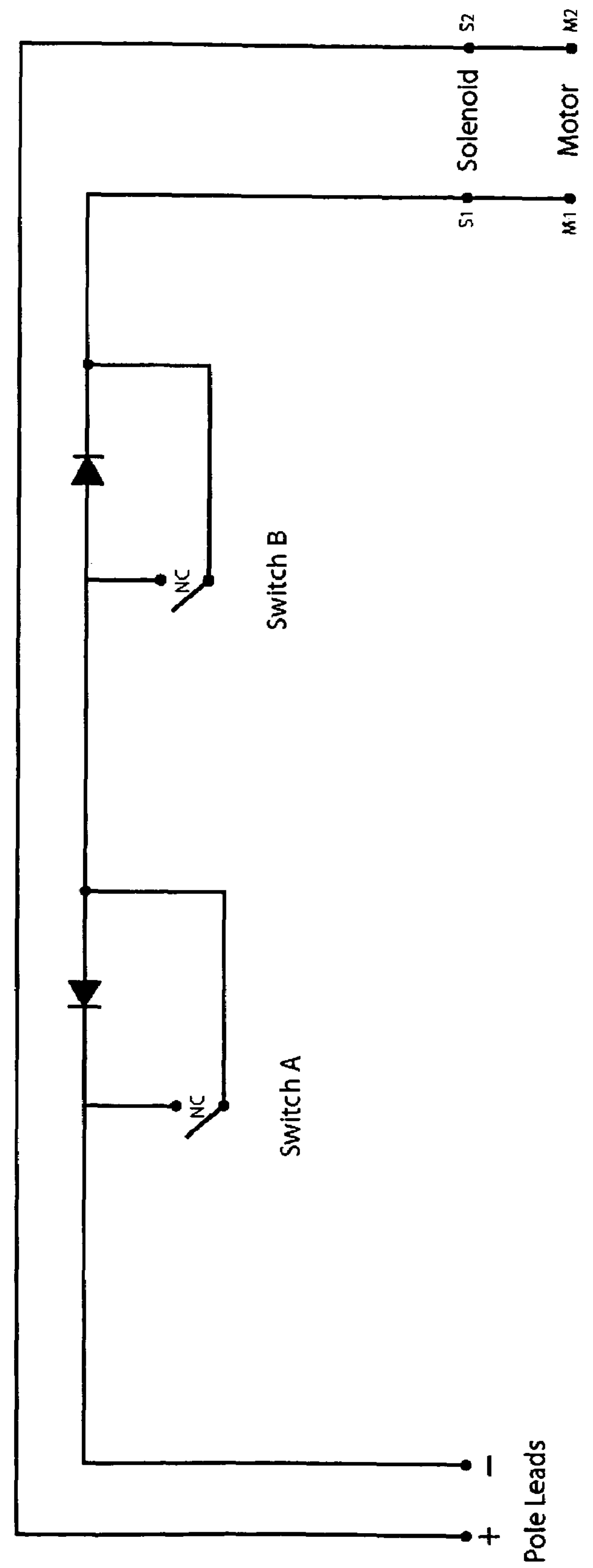
FIG. 17 is a circuit diagram for the hoist.
Figure 18:
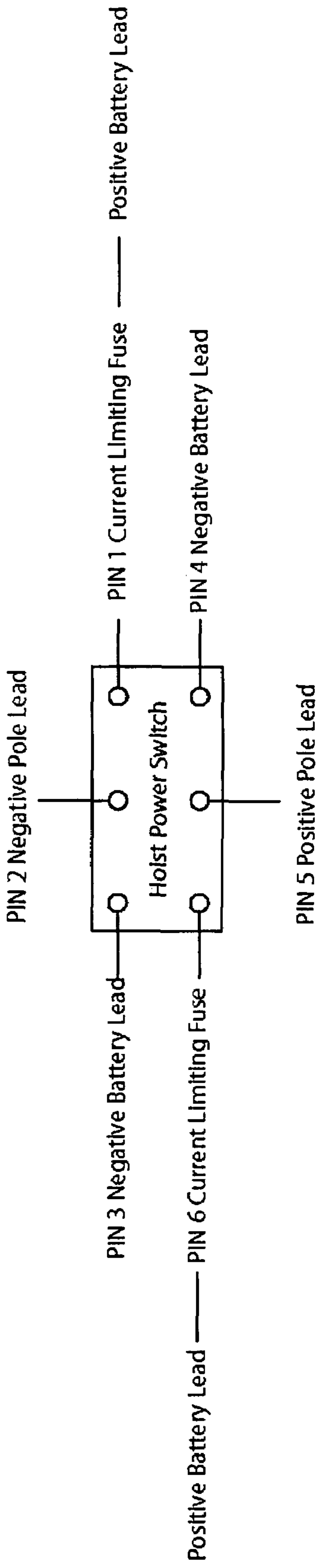
FIG. 18 is a circuit diagram for the control panel on the power unit.

FIGS. 17 and 18 show examples of suitable circuitry for the hoist system. FIG. 17 is a circuit diagram for the hoist. FIG. 18 is a circuit diagram for the control unit.

Method of Operation

Any one or more of the embodiments shown may be used to perform various methods for raising, lowering or otherwise moving objects and loads. One example method for moving loads includes the steps of using a load moving system having a motor assembly with a motor for moving a load-moving member, and a motor assembly power connector electrically coupled with the motor and a separate power unit having a power unit power connector electrically coupled to a power source; temporarily contacting the motor assembly power connector and the power unit power connector to provide power to the motor; completing a move of the load-moving member; and separating the motor assembly power connector and the power unit power connector. If desired, the power unit power connector may then be used to perform the same method on one or more additional motor assemblies.

Although the embodiments show have disclosed the device being used for raising and lowering of free hanging loads, alternate embodiments of the invention could use the telescopic rod to move a load horizontally. Other embodiments could use pulleys or other mechanisms to move loads horizontally, vertically or diagonally with rigid load-moving members or along rails or tracks using flexible load-moving members.

Many features have been listed with particular configurations, options, and embodiments. Any one or more of the features described may be added to or combined with any of the other embodiments or other standard devices to create alternate combinations and embodiments.

Although the invention has been fully described above, in relation to various exemplary embodiments, various additions or other changes may be made to the described embodiments without departing from the scope of the present invention. Thus, the foregoing description has been provided for exemplary purposes only and should not be interpreted to limit the scope of the invention as set forth in the following claims.

What is claimed is:

1. A hoist system, comprising:
a motor assembly, including:
a load-moving member,
a motor for moving of said load-moving member,
and a first portion of a mating power connector coupled to said motor;
and a power unit, including:
a second portion of said mating power connector,
a power coupling capable of coupling said second portion of said mating power connector to a power source;
and at least one control;
wherein said motor unit and said power unit are separable;
and wherein said at least one control is configured to selectively activate and deactivate said motor when said power unit is connected to said motor assembly.

2. The hoist system of claim 1, further comprising a spool and wherein said load-moving member is flexible and is capable of being wound onto said spool.

3. The hoist system of claim 2, wherein said motor drives at least one gear and said at least one gear drives said spool.

4. The hoist system of claim 3, wherein said at least one gear is a planetary gear.

5. The hoist system of claim 1, wherein said load-moving member is formed of flexible, flat webbing.

6. The hoist system of claim 1, wherein said power unit has an elongated body having a first end and a second end, and wherein said second portion of said mating power connector is located proximate said first end, and wherein said at least one control is located proximate said second end.

7. The hoist system of claim 1, wherein said power source is couplable to said second portion of said mating power connector.

8. The hoist system of claim 7, wherein said coupling between said first portion of said mating power connector and said motor is an electrical coupling and wherein said coupling between said second portion of said mating power connector the power source is an electrical coupling.

9. The hoist system of claim 7, wherein said power source is a battery pack.

10. The hoist system of claim 9, wherein said battery pack is rechargeable and the hoist system further comprises a charging station.

11. The hoist system of claim 1, further comprising an automatic cut-off.

12. The hoist system of claim 11, wherein the automatic cut-off comprises a pivoting lever having an opening surrounding said load-supporting member, a stopper connected to said load-supporting member and a cut-off switch located to be engagable by a portion of said pivoting lever.

13. The hoist system of claim 1, further comprising mounting hardware to connect said motor unit to a support structure.

14. The hoist system of claim 1, wherein said first portion of said mating power connector includes at least two leads.

15. The hoist system of claim 14, wherein said second portion of said mating power connector includes a hook with at least two contacts.

16. The hoist system of claim 1, wherein said first portion of said mating power connector includes one negative lead and two positive leads, said negative lead being located between said two positive leads.

17. The hoist system of claim 1, wherein said first portion of said mating power connector includes one positive lead and two negative leads, said positive lead being located between said two negative leads.

18. The hoist system of claim 1 wherein a power cable connects said first portion of said mating power connector to said motor.

19. The hoist system of claim 1, further comprising a solenoid and brake, said brake having a braking position and a released position, wherein said solenoid moves said brake between said braking position and said released position.

20. The hoist system of claim 1, wherein said load-moving member has a load connection end, wherein said load connection end is movable between a loading position to a storage position.

21. The hoist system of claim 1, wherein said at least one control is switch capable of intermittently connecting said power source to said second portion of said mating power connector.

22. A hoist system, comprising:

a motor unit, including:

a motor, a spool driven by said motor, an flexible load-suspending member capable of being wound onto said spool and having a first end attached to said spool, and a first portion of a mating power connector connected to said motor;

and a power unit, including:

an elongated body having a first end and a second end, a second portion of said mating power connector proximate said first end of said elongated body, a switch located proximate said second end of said elongated body, and a power source connected to said second portion of said mating power connector;

wherein said motor unit and said power unit are separable.

23. The hoist system of claim 22, wherein said load-suspending member is formed of flat webbing.

24. The hoist system of claim 22, wherein said power source is a battery pack and said battery pack is rechargeable and the hoist system further comprises a charging station.

25. A method for moving loads comprising the steps:

(a) providing a load-moving system comprising:

at least one motor assembly comprising a motor for moving a load-moving member, and a motor assembly power connector coupled with said motor;

and providing separate from said motor assembly at least one power unit comprising a power unit power connector coupled to a power source and at least one control for controlling said motor assembly;

(b) temporarily contacting said motor assembly power connector and said power unit power connector to provide power to said motor;

(c) activating one of the at least one control to complete a move of said load-moving member;

(d) and separating said motor assembly power connector and said power unit power connector.

26. The method of claim 25, wherein step (c) includes extending and withdrawing said load-moving member.

27. The method of claim 25, wherein step (c) moving said load-moving member, includes raising and lowering said load-moving member.

28. The method of claim 25, wherein said load moving system of step (a) comprises a hoist.

29. The method of claim 25, wherein said at least one control is a switch.

30. A method for moving loads comprising the steps:

(a) providing a load moving system comprising:

a first motor assembly comprising a first motor for moving a first load-moving member, and a first motor assembly power connector coupled with said first motor;

a second motor assembly comprising a second motor for moving a second load-moving member, and a second motor assembly power connector coupled with said second motor;

and providing separate from said first and second motor assemblies at least one power unit comprising a power unit power connector coupled to a power source;

(b) temporarily contacting said first motor assembly power connector and said power unit power connector to provide power to said first motor, (c) completing a move of said first load-moving member of said first motor assembly;

(e) separating said first motor assembly power connector and said power unit power connector;

(f) temporarily contacting said second motor assembly power connector and said power unit power connector to provide power to said second motor, (g) completing a move of said second load-moving member of said second motor assembly;

(h) and separating said second motor assembly power connector and said power unit power connector.

* * * * *